(12) United States Patent
Blauer et al.

(10) Patent No.: US 7,111,327 B1
(45) Date of Patent: Sep. 26, 2006

(54) LIGHTWEIGHT PROTECTIVE CLOTHING AND TEXTILE MATERIAL INCORPORATED THEREIN

(75) Inventors: Stephen J Blauer, Lexington, MA (US); Toufic G. Atallah, Reading, MA (US)

(73) Assignee: Blauer Manufacturing Company, Inc., Boston, MA (US)

( * ) Notice: Subject to any disclaimer, the term of this patent is extended or adjusted under 35 U.S.C. 154(b) by 0 days.

(21) Appl. No.: 10/601,949

(22) Filed: Jun. 23, 2003

(51) Int. Cl.
*A41D 3/04* (2006.01)

(52) U.S. Cl. .................. 2/82; 2/97; 2/DIG. 2
(58) Field of Classification Search ............. 2/82–87, 2/69, 79, 247, 97, 227, 228, 243.1, 93, 94, 2/DIG. 1, DIG. 2, 455, 904; 428/309.9, 428/315.9, 96
See application file for complete search history.

(56) References Cited

U.S. PATENT DOCUMENTS

| | | | | | |
|---|---|---|---|---|---|
| 1,052,475 | A | * | 2/1913 | Friedman | 2/93 |
| 1,224,704 | A | * | 5/1917 | Berger | 2/85 |
| 1,648,250 | A | * | 11/1927 | Woislawsky | 2/98 |
| 2,138,041 | A | * | 11/1938 | Preston | 2/93 |
| 2,174,831 | A | * | 10/1939 | Muller | 112/424 |
| 2,263,544 | A | * | 11/1941 | Rosenstein | 2/90 |
| 2,322,510 | A | * | 6/1943 | Dufine | 2/97 |
| 2,361,381 | A | * | 10/1944 | Callahan et al. | 2/93 |
| 2,412,988 | A | * | 12/1946 | Kleinman | 2/93 |
| 2,711,539 | A | * | 6/1955 | Loscher | 2/93 |
| 3,018,486 | A | * | 1/1962 | Bukspan | 2/87 |
| 3,026,225 | A | * | 3/1962 | Ostby, Jr. | 428/57 |
| 3,090,047 | A | * | 5/1963 | De Grazia | 112/425 |
| 3,846,844 | A | * | 11/1974 | Graf | 2/93 |
| 4,076,881 | A | * | 2/1978 | Sato | 428/195.1 |
| 4,079,466 | A | * | 3/1978 | Rosenstein | 2/87 |
| 4,214,319 | A | * | 7/1980 | Bollag | 2/108 |
| 4,685,155 | A | * | 8/1987 | Fingerhut et al. | 2/272 |
| 5,029,344 | A | * | 7/1991 | Shannon et al. | 2/69 |
| 5,159,718 | A | * | 11/1992 | Moyer | 2/69 |
| 5,165,110 | A | * | 11/1992 | Grilliot et al. | 2/93 |
| RE35,436 | E | * | 2/1997 | Grilliot et al. | 2/93 |
| 5,884,332 | A | * | 3/1999 | Snedeker | 2/97 |
| 5,940,884 | A | * | 8/1999 | Grilliot et al. | 2/125 |
| 5,996,121 | A | * | 12/1999 | Harris | 2/69 |
| 6,018,819 | A | * | 2/2000 | King et al. | 2/69 |
| 6,112,328 | A | * | 9/2000 | Spector | 2/69 |
| 6,128,783 | A | * | 10/2000 | Blauer et al. | 2/90 |
| 6,308,344 | B1 | * | 10/2001 | Spink | 2/458 |
| 6,345,393 | B1 | * | 2/2002 | Bayer | 2/94 |
| 6,430,754 | B1 | * | 8/2002 | Taylor et al. | 2/458 |
| 6,649,251 | B1 | * | 11/2003 | Druecke et al. | 428/198 |
| 6,662,754 | B1 | * | 12/2003 | Wilson | 119/850 |
| 6,728,970 | B1 | * | 5/2004 | Grilliot et al. | 2/81 |
| 6,797,352 | B1 | * | 9/2004 | Fowler | 428/57 |

(Continued)

*Primary Examiner*—Alissa L. Hoey
(74) *Attorney, Agent, or Firm*—Altman & Martin

(57) ABSTRACT

A reversible raincoat or rain jacket is constructed from a plurality of panels of specialized fabric, which are joined by threaded seams and which alternatively present either a dress mode exterior or a protective mode exterior. The specialized fabric is composed of a dress weave facing, a high visibility knit facing and an interstice therebetween. The interstice consists essentially of a vapor permeable membrane. The seams are sealed at the knit facing, along the threaded seams and along borders of the panels, by tape which matches the knit facing fabric in appearance. Both faces of the fabric are infused with a water repellant treatment.

8 Claims, 2 Drawing Sheets

U.S. PATENT DOCUMENTS

| | | | |
|---|---|---|---|
| 6,868,558 B1 * | 3/2005 | Majerfeld | 2/96 |
| 6,892,394 B1 * | 5/2005 | Grilliot et al. | 2/81 |
| 2001/0034897 A1 * | 11/2001 | Belcher | 2/458 |
| 2003/0044563 A1 * | 3/2003 | Kocinec et al. | 428/63 |
| 2004/0143883 A1 * | 7/2004 | Grilliot et al. | 2/93 |
| 2004/0154084 A1 * | 8/2004 | Aldridge et al. | 2/458 |

* cited by examiner

LIGHTWEIGHT PROTECTIVE CLOTHING AND TEXTILE MATERIAL INCORPORATED THEREIN

BACKGROUND OF THE INVENTION

1. Field of the Invention

The present invention relates to protective clothing and textile materials for their fabrication, and, more particularly, to reversible protective clothing such as reversible rainwear and lightweight materials for their fabrication. Still more particularly, the present invention relates to uniforms of the type used in inclement environments by personnel involved in law enforcement, emergency medicine, fire and safety service, general work service and the like.

2. The Prior Art

Waterproof and windproof protective clothing such as rainwear have suffered from such uncomfortable characteristics as undue weight, vapor impermeability, and unpleasant hand and feel. The undue weight often is due to relatively heavy plastic or rubber facing or impregnation. The vapor impermeability or vapor locking often is inherent in the plastic or rubber coating structures that are relied upon for waterproofing and wind proofing. The unpleasant hand and feel often is inherent in the ergonomics of non-textile surfaces. These deficiencies have made it particularly difficult to fabricate acceptable reversible garments having both the hand and feel of conventional dress clothing and the desired protection against inclement weather, chemical, medical or other environments.

SUMMARY OF THE INVENTION

An object of the present invention is to provide rainwear and other protective clothing that is fabricated from a very thin clothing material, which comprises a special laminate of opposed textile facing strata, and a micro-porous interstice stratum therebetween. In one form, the clothing is a reversible raincoat or rain jacket, in which one of the textile facings is an abrasion resistant dress weave and the other is a high visibility knit. This laminate is waterproof, windproof and breathable, but nevertheless provides the hand, feel and comfort of a single ply fabric. Another object of the present invention is to provide reversible protective clothing, which in dress mode is a uniform in appearance, but in work mode is fully protective. The present invention particularly contemplates rainwear that, in dress mode is stylish in appearance, and in work mode presents fluorescent and retroreflective luminosity for use by public service professionals.

More specifically, the reversible rainwear of the present invention comprises a plurality of panels joined by a plurality of seams, the panels being fabricated from a clothing material consisting of a pair of facing strata and an interstice stratum therebetween, one of the facing strata consisting essentially of a woven fabric for dress, the other of the facing strata consisting essentially of a knit fabric for fluorescence and high visibility. The surfaces of both the facing strata and the seams are sealed by thermally laminated tape. The arrangement is such that, in dress mode, the raincoat's style remains intact, and, in work mode, the knit face retains aesthetic integrity despite presence of sealing tape.

Other objects of the present invention will in part be obvious and will in part appear hereinafter.

BRIEF DESCRIPTION OF THE DRAWINGS

For a fuller understanding of the nature and objects of the present invention, reference is made to the following specification, which is to be taken in connection with the accompanying drawings wherein:

FIG. 1 is a front view of a reversible raincoat embodying the present invention, dress side out and work side in;

FIG. 2 is a front view of the raincoat of FIG. 1, work side out and dress side in;

DETAILED DESCRIPTION OF THE PREFERRED EMBODIMENT

Figure 1:
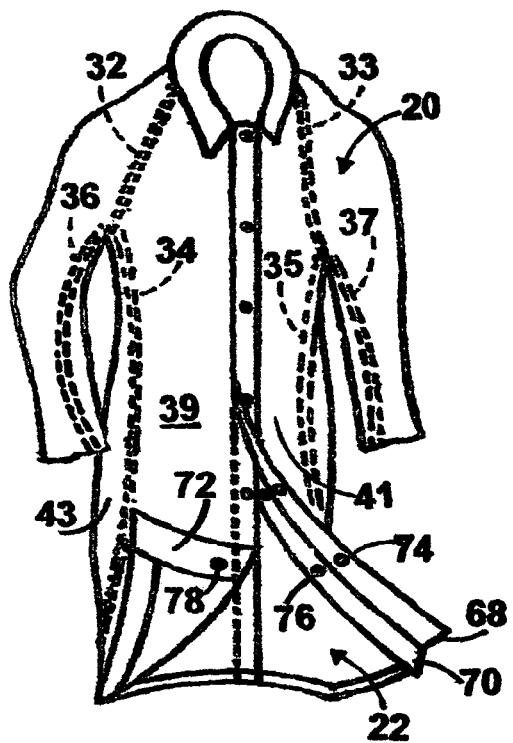
Figure 2:
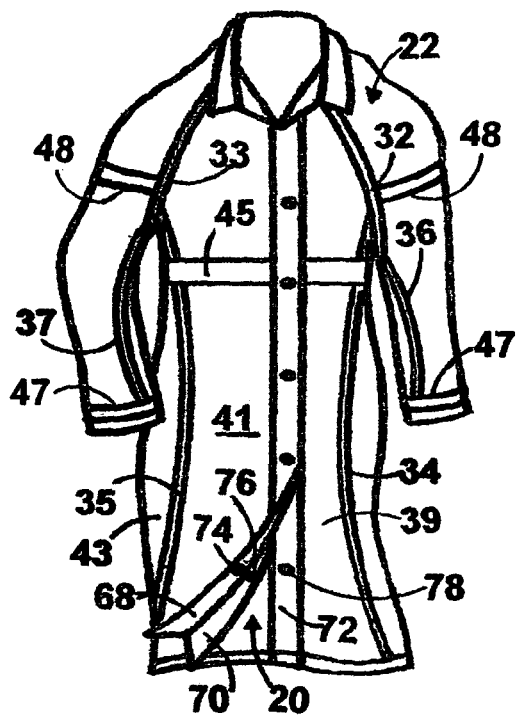
Figure 4:
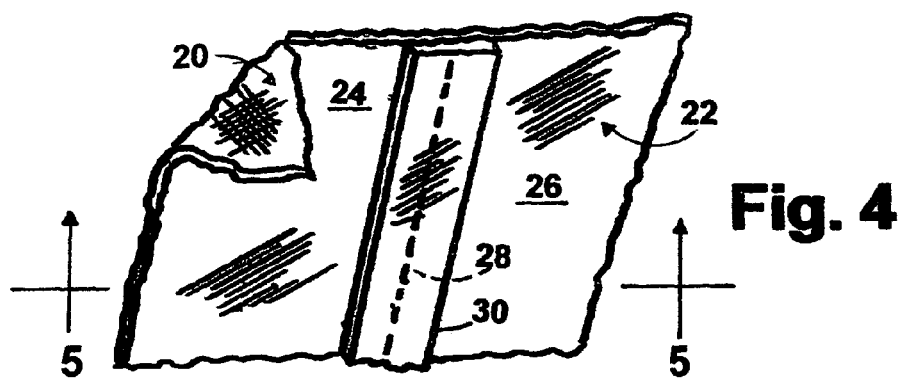
FIG. 4 is a broken away, perspective view of a fragment of a garment that is composed of the clothing material of the present invention.
Figure 5:
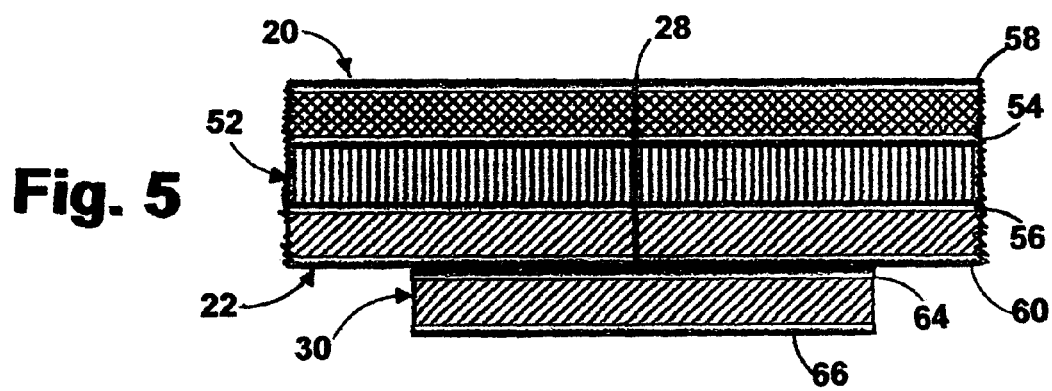
FIG. 5 is a grossly exaggerated, cross-section of the fragment of FIG. 4, taken substantially along the line 5—5 of FIG. 4.

FIGS. 1 and 2 illustrate a reversible raincoat that is fabricated from patterns or panels of the thin clothing material utilized by the present invention. As shown in FIGS. 4 and 5, each panel of this raincoat comprises a primary dress facing 20 and a secondary work facing 22. As shown in FIG. 1, dress facing 20 is exterior and work facing 22 is interior. As shown in FIG. 2, work facing 22 is exterior and dress facing 20 is interior.

In the fragment of the raincoat shown in FIG. 4, two of the raincoat's panels 24, 26 are shown as being stitched along a seam 28. Seam 28 is sealed by a tape 30, which is bonded to and extends along the seam in contact with the contiguous edges of the work facings of panels 24 and 26. With the raincoat in dress mode as in FIG. 1, the taped seams are shown as dashed lines 32,33,34,35,36, and 37, depicting the tape on the work faces when concealed at the interior of the raincoat. With the raincoat in work mode as in FIG. 2, the taped seams are shown as solid lines 32,33,34,35,36 and 37, depicting the tape on the work faces when revealed at the exterior of the raincoat. When the raincoat is in protective mode, a retro-reflective band 45 surrounds the chest and back and retro reflective bands 47 and 48 surround the wrists and arms of the wearer. Seams 32 and 33 join the arms to the bodice. Seams 34 and 35 join front panels 39, 41 of the bodice to a back panel 43, which spans the back of the raincoat. Seams 36 and 37 join the lower portions of the reversely contiguous edges of the single piece goods from which the sleeves are formed. FIG. 5 illustrates details of the clothing material from which the sleeves, and the front and back panels are fabricated. This clothing material comprises a laminate of opposed facing strata 20 and 22, and an interstice stratum 52. Preferably: stratum 20 is a weave of dark color for dress use; stratum 22 is a knit of high luminosity or public service use; and interstice stratum 52 is a membrane with high vapor transmission. Facing stratum 20, interstice stratum 52 and facing stratum 22 are laminated together by adhesive bonding strata 54 and 56. The outer surfaces of facing strata 20 and 22 are infused with water repellant polymeric coatings 58 and 60, which, in combination with the microporous membrane, effectively render the fabric water repellant, waterproof and windproof. Seam 28 is sealed at the surface of the knit facing strata 22 of adjacent panels by knit tape 30, which has the same functional and visual characteristics as have the knit facing strata. The inner surface of tape 30 is sealed to coating 60 offacing stratum 22 by a bonding stratum 64. The outer surface of tape 30 is provided with a stratum 66. The resulting seamed laminate configuration is waterproof, windproof and breathable, but nevertheless provides the hand, feel and comfort of a single ply fabric.

The arrangement for fastening the front of the raincoat of FIGS. 1 and 2 includes columns of fasteners that extend from the neck to the lower edge of the raincoat along the free borders at the front of the raincoat. At one border are a pair of flaps 68, 70, along which extend columns of paired fasteners 74, 76. At the other border is a column of fasteners 78. Each pair of fasteners 74, 76 coacts with a fastener 78 in the manner shown in FIG. 6. Fastener 74 includes a button 80 and an inwardly directed element 82, which are joined by a connector (not shown) through flap 68. Fastener 76 includes a button 84 and an inwardly directed element 86, which are joined by a connector (not shown) through flap 70. Fastener 78 includes outwardly directed elements 88, 90, which are joined by a connector (not shown) through border 72. Inwardly directed elements 82 and 86 are adapted to mate, i.e. to snap together, with outwardly directed elements 88 and 90 in order to enable the front of the raincoat to be fastened and unfastened.

Figure 6:
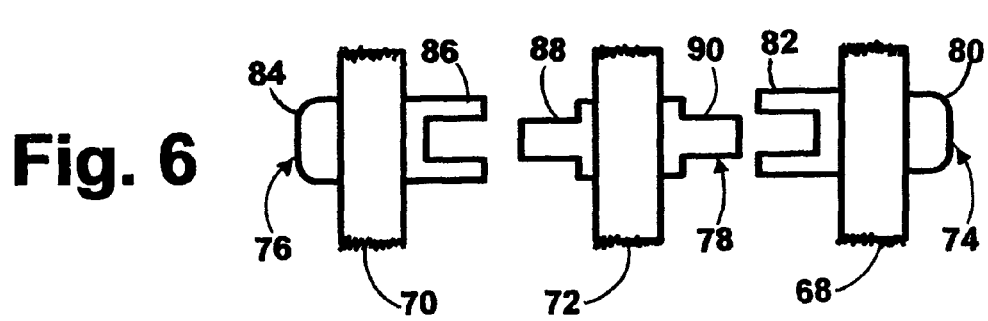
FIG. 6 is a grossly exaggerated, fragmentary view of the snap fastener arrangement of the raincoat of FIGS. 1 and 2 and the rain jacket of FIG. 3.

Thus, when the raincoat is un-reversed as shown in FIG. 1, fastening the front is achieved by mating elements 82 and 90 and elements 86 and 88 (FIG. 6). And, when the raincoat is reversed as shown in FIG. 2, fastening the front is achieved by mating elements 82 and 88 and elements 86 and 90 (FIG. 6).

Figure 3:
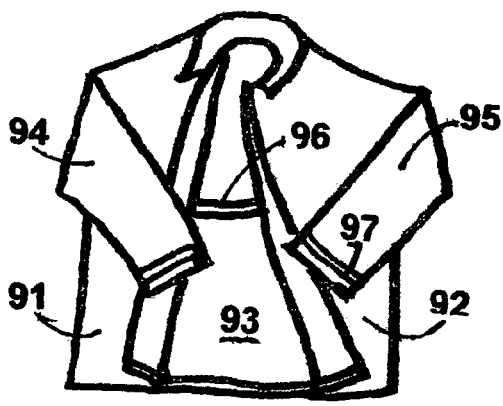
FIG. 3 is a front view of a reversible rain jacket, embodying the present invention, dress side out.

The rain jacket of FIG. 3 is analogous to the raincoat of FIGS. 1 and 2 in structure and function. It includes a bodice having front panels 91 and 92 and a back panel 93, sleeves 94 and 95, and retro-reflective bands 96 and 97.

The following non-limiting examples further describe details of the illustrated reversible raincoat and rain jacket.

EXAMPLE 1

Preferably, facing stratum 20, for durability and abrasion resistance, is a light weight nylon or polyester weave of a dark uniform color, such as navy, midnight blue or charcoal black. In accordance with the present invention, this is a plain weave in the form of a 100% textured polyester, ranging from 2.0 to 4.5 oz. per square yard. Preferably, this weave weighs approximately 2.18 oz. per square yard, and has a 70 denier warp and 140 denier filling.

EXAMPLE 2

Preferably, interstice stratum 52 is composed of a waterproof, windproof and breathable microporous membrane of the type sold by W.L Gore under the trade designation, Gore-Tex or Crosstech. Typically, the weight of the membrane ranges from 0.75 oz. to 2.5 oz. per square yard, and preferably is approximately 1.5 oz. per square yard. The membrane consists of expanded polytetrafluroroethylene that is impregnated with an oleophobic polymer. This membrane contains billions of pores per square inch, each being thousands of times smaller than a water droplet but hundreds of times larger than a water vapor molecule. This composition passes perspiration vapor from the inside, but blocks water and wind from the outside. The impregnated oleophobic polymer provides resistance against blood-borne pathogen and common chemical liquid penetration.

EXAMPLE 3

Preferably, facing stratum 22 is a high luminosity polyester knit that has been fluorescent yellow or orange. In accordance with the present invention, this knit weighs between 1 oz. and 2.5 oz. per square yard, and preferably weighs approximately 1.65 oz. per square yard. Preferably, this knit weighs between 1 oz. and 2.5 oz. per square yard, and preferably weighs approximately 1.65 oz. per square yard. Preferably, the appearance of the tape is virtually the same as the appearance of knit stratum 32 so that it blends visually with knit stratum 32 when bonded thereto.

EXAMPLE 4

In one form, bonding strata 54, 56 and 64 are composed of a micro-porous or hydrophilic polymer, such as polyurethane.

EXAMPLE 5

Generally, the illustrated laminate ranges in total thickness between 0.2 to 0.9 millimeters and ranges in weight between 5 and 6 ounces per square yard. Preferably, the thickness is approximately 0.38 millimeters and the weight is approximately 5.4 ounces per square yard. Water repellent treatments 58, 60 at both faces of the laminate and at the exterior of the tape generally are composed of a fluorocarbon polymer such as polytetrafluoroethylene.

EXAMPLE 6

Generally, tape 62 is composed of the same material as knit stratum 22, namely a high luminosity polyester knit that is fluorescent yellow or orange in color. Preferably, the appearance of the tape is virtually the same as the appearance of knit stratum 32 so that it blends visually with knit stratum 32 when bonded thereto.

OPERATION

The reversible raincoat of FIGS. 1 and 2 and the reversible rain jacket of FIG. 3 are similar in operation. Each may be worn as stylish outerwear with the woven dress facing out, or as work outerwear for public service or the like with the high visibility work facing out. The structure and function of the rain jacket of FIG. 3 is essentially the same as the structure and function of the raincoat of FIGS. 1 and 2, except that the rain jacket extends from neck to waist, whereas the raincoat extends from neck to lower legs. In each case, sections of stitching 34 and 35 are interrupted as at 92, 94 in FIG. 1 to leave openings through which inner clothing pockets are accessible to the hands of a wearer. When the illustrated garment is worn dress-side-out, it has the aesthetic appearance of a well-styled coat or jacket. When the illustrated garment is worn work-side-out, it presents the high visibility appearance that often is required by police and other safety officers. Whether the illustrated garment is worn dress-side-out or work-side-out, all of its protective features remain.

What is claimed is:

1. A reversible raincoat providing a dress mode and a protective mode for wearer:
    (a) said raincoat incorporating a plurality of panels, said panels including a forward pair of the panels that span the anterior of said wearer and at least a rearward panel that spans the posterior of said wearer;

(b) said panels being stitched together along seams;
(c) each of said panels being fabricated from a single ply of fabric formed from a laminate of a protective facing, a dress facing, and an interstice stratum there between;
(d) said interstice stratum being vapor permeable;
(e) said protective facing, said dress facing and said interstice stratum being laminated together by a polymer;
(f) said protective facing being a knit infused with a water repellent polymer;
(g) said dress facing being a weave infused with a water repellant polymer;
(h) tape extending along at least some of said seams in contact with and bonded to said protective facing across said last-mentioned seams;
(i) said tape and said protective facing being fluorescent;
(j) said forward panels providing flaps along the forward edges of said forward pair of said panels;
(k) a column of primary snaps along one of said flaps;
(l) columns of secondary snaps along flaps of another of said forward panels;
(m) one of said columns of secondary snaps mating with said column of pry snaps when said raincoat is in said dress mode;
(n) the other of said columns of secondary snaps mating with said column of primary snaps when said raincoat is in said protective mode.

2. The reversible raincoat of claim 1 wherein said protective facing, for durability and abrasion resistance, is a light weight nylon or polyester weave ranging from 2.0 to 4.5 oz. per square yard, and having a 70 denier warp and a 140 denier filling.

3. The reversible raincoat of claim 1 wherein said interstice stratum is composed of a waterproof, windproof and breathable microporous membrane, the weight of said membrane ranging from 0.75 oz. to 2.5 oz. per square yard.

4. The reversible raincoat of claim 1 wherein said protective facing is a high luminosity polyester knit that is fluorescent, said knit weighing between 1 oz. and 2.5 oz. per square yard.

5. The reversible raincoat of claim 1 wherein said laminate ranges in total thickness between 0.2 to 0.9 millimeters and ranges in weight between 5 and 6 ounces per square yard.

6. Reversible protective clothing comprising a plurality of panels joined by a plurality of threaded seams for alternatively presenting a dress mode exterior or a protective mode exterior:
(a) a plurality of said panels being fabricated from a clothing material including a dress facing, a work facing and an interstice there between;
(b) said dress facing consisting essentially of a first fabric, said work facing stratum consisting essentially of a second fabric, said interstice strata consisting essentially of a vapor permeable membrane;
(c) said dress mode presenting an exterior characterized by said first fabric;
(d) said work mode presenting an exterior characterized by said second fabric; and
(e) tape along at least some of said threaded seams in contact with said second fabric along borders of said panels to seal said threaded seams;
(f) both said dress facing and said work facing being infused with a water repellant treatment;
(g) said tape being composed of a fabric that is like said second fabric in visual appearance;
(h) said clothing material weighting between 3.75 and 9.5 ounces per square yard;
(i) said first fabric being a dress weave of dark color and said second fabric being a protective knit of high visibility;
(j) said water repellant treatment being a fluoroethylene polymer;
(k) said membrane being a polytetrafluoroethylene film.

7. A reversible raincoat providing a dress mode and a protective mode for a wearer:
(a) said raincoat incorporating a plurality of panels, said panels including a forward pair of the panels that span the anterior of said wearer and at least a rearward panel that spans the posterior of said wearer;
(b) said panels being stitched together along seams;
(c) each of said panels being fabricated from a single ply of fabric formed from a laminate of a protective facing, a dress facing, and an interstice stratum there between;
(d) said interstice stratum being vapor permeable;
(e) said protective facing, said dress facing and said interstice stratum being laminated together by a microporous or hydrophilic polymer;
(f) said protective facing being a knit infused with a fluoroethylene polymer;
(g) said dress facing being a weave infused with a fluoroethylene polymer;
(h) tape extending along at least some of said seams in contact with and laminated to said protective facing across said last-mentioned seams;
(i) said tape and said protective facing being fluorescent;
(j) said forward panels providing flaps along the forward edges of said forward pair of said panels;
(k) a column of primary snaps along one of said forward panels;
(l) columns of secondary snaps along flaps of another of said forward panels;
(m) one of said columns of secondary snaps mating with said column of primary snaps when said raincoat is in said dress mode;
(n) the other of said columns of secondary snaps mating with said column of primary snaps when said raincoat is in said protective mode;
(o) said protective facing, for durability and abrasion resistance, being a light weight nylon or polyester weave of a dark uniform color, said weave ranging from 2.0 to 4.5 oz. per square yard, and having a 70 denier warp and a 140 denier filling;
(p) said interstice stratum being composed of a waterproof, windproof and breathable microporous membrane, the weight of said membrane ranging from 0.75 oz. to 2.5 oz. per square yard, said membrane consisting of expanded polytetrafluoroethylene that is impregnated with an oleophobic polymer;
(q) said protective facing stratum being a high luminosity polyester knit weighing between 1 oz. and 2.5 oz. per square yard;
(r) said laminate ranging in total thickness between 0.2 to 0.9 millimeters and ranging in weight between 5 and 6 ounces per square yard.

8. A reversible rain jacket providing a dress mode and a protective mode for a wearer:
(a) said rain jacket incorporating a plurality of panels, said panels including a forward pair of the panels that span the anterior of said wearer and at least a rearward panel that spans the posterior of said wearer;
(b) said panels being stitched together along seams;

(c) each of said panels being fabricated from a single ply of fabric formed from a laminate of a protective facing, a dress facing, and an interstice stratum there between;
(d) said interstice stratum being vapor permeable;
(e) said protective facing, said dress facing and said interstice stratum being laminated together by a microporous or hydrophilic polymer;
(f) said protective facing being a knit infused with a fluoroethylene polymer;
(g) said dress facing being a weave infused with a fluoroethylene polymer;
(h) tape extending along at least some of said seams in contact with and laminated to said protective facing across said last-mentioned seams;
(i) said tape and said protective facing being fluorescent;
(j) said forward panels providing flaps along the forward edges of said forward pair of said panels;
(k) a column of primary snaps along one of said forward panels;
(l) columns of secondary snaps along flaps of another of said forward panels;
(m) one of said columns of secondary snaps mating with said column of primary snaps when said rain jacket is in said dress mode;
(n) the other of said columns of secondary snaps mating with said column of primary snaps when said rain jacket is in said protective mode;
(o) said protective facing, for durability and abrasion resistance, being a light weight nylon or polyester weave of a dark uniform color, said weave from 2.0 to 4.5 oz. per square yard, and having a 70 denier warp and a 140 denier filling;
(p) said interstice stratum being composed of a waterproof, windproof and breathable microporous membrane, the weight of said membrane ranging from 0.75 oz. to 2.5 oz. per square yard, said membrane consisting of expanded polytetrafluoroethylene that is impregnated with an oleophobic polymer;
(q) said protective facing stratum being a high luminosity polyester knit weighing between 1 oz. and 2.5 oz. per square yard;
(r) said laminate ranging in total thickness between 0.2 to 0.9 millimeters and ranging in weight between 5 and 6 ounces per square yard.

* * * * *